(12) United States Patent
Bedwell et al.

(10) Patent No.: US 8,935,574 B2
(45) Date of Patent: Jan. 13, 2015

(54) CORRELATING TRACES IN A COMPUTING SYSTEM

(75) Inventors: Ryan D. Bedwell, Kyle, TX (US); Elizabeth M. Cooper, Los Gatos, CA (US); Eric M. Rentschler, Steamboat Springs, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 422 days.

(21) Appl. No.: 13/328,512

(22) Filed: Dec. 16, 2011

(65) Prior Publication Data

US 2013/0159780 A1    Jun. 20, 2013

(51) Int. Cl.
   *G06F 11/00*    (2006.01)
(52) U.S. Cl.
   USPC .................................. 714/34; 714/45; 714/33
(58) Field of Classification Search
   CPC .......................... G06F 11/3636; G06F 11/3476
   USPC ................................................ 714/34, 32, 25
   See application file for complete search history.

(56) References Cited

U.S. PATENT DOCUMENTS

| | | |
|---|---|---|
| 3,896,419 A | 7/1975 | Lange et al. |
| 5,210,843 A | 5/1993 | Ayers |
| 5,381,533 A | 1/1995 | Peleg et al. |
| 5,563,594 A | 10/1996 | Ford et al. |
| 5,669,003 A | 9/1997 | Carmean et al. |
| 5,764,885 A | 6/1998 | Sites et al. |
| 5,787,095 A | 7/1998 | Myers et al. |
| 5,881,261 A | 3/1999 | Favor et al. |
| 5,896,528 A | 4/1999 | Katsuno et al. |
| 5,930,497 A | 7/1999 | Cherian et al. |
| 5,944,841 A | 8/1999 | Christie |
| 6,014,742 A | 1/2000 | Krick et al. |
| 6,167,536 A | 12/2000 | Moann |
| 6,185,675 B1 | 2/2001 | Kranich et al. |
| 6,195,744 B1 | 2/2001 | Favor et al. |
| 6,205,508 B1 | 3/2001 | Bailey et al. |
| 6,212,628 B1 | 4/2001 | Abercrombie et al. |

(Continued)

FOREIGN PATENT DOCUMENTS

| | | |
|---|---|---|
| EP | 0 957 428 | 11/1999 |
| GB | 2 381 101 | 4/2003 |

(Continued)

OTHER PUBLICATIONS

ARM Limited; ETM9, Revision: r2p2; Technical Reference Manual; 1999-2002; pp. 1-20; ARM DDI 0157F; ARM Inc., 150 Rose Orchard Way, San Jose, CA 95134-1358, U.S.A.

(Continued)

*Primary Examiner* — Sarai Butler
(74) *Attorney, Agent, or Firm* — Rory D. Rankin; Meyertons, Hood, Kivlin, Kowert & Goetzel, P.C.

(57) ABSTRACT

An apparatus, processor, and method for synchronizing trace data. A processor includes multiple cores, and each core operates at a different local clock frequency. A global clock is distributed to each core, and a timestamp is generated using the global clock and the local clock. The timestamp and a local clock saturation value are included in each trace entry, and the local clock saturation value is equal to the ratio between the local clock and the global clock. The trace entries from separate cores are time-correlated in a post-processing phase based on the timestamp and local clock saturation values.

20 Claims, 8 Drawing Sheets

(56) References Cited

U.S. PATENT DOCUMENTS

| | | |
|---|---|---|
| 6,216,206 B1 | 4/2001 | Peled et al. |
| 6,233,678 B1 | 5/2001 | Bala |
| 6,247,121 B1 | 6/2001 | Akkary et al. |
| 6,256,727 B1 | 7/2001 | McDonald |
| 6,256,728 B1 | 7/2001 | Witt et al. |
| 6,298,394 B1 | 10/2001 | Edwards et al. |
| 6,311,296 B1* | 10/2001 | Congdon ............... 714/56 |
| 6,321,290 B1 | 11/2001 | Yamashita |
| 6,339,822 B1 | 1/2002 | Miller |
| 6,345,295 B1 | 2/2002 | Beardsley et al. |
| 6,357,016 B1 | 3/2002 | Rodgers et al. |
| 6,449,714 B1 | 9/2002 | Sinharoy |
| 6,493,821 B1 | 12/2002 | D'Sa et al. |
| 6,578,128 B1 | 6/2003 | Arsenault et al. |
| 6,633,838 B1 | 10/2003 | Arimilli et al. |
| 6,658,519 B1 | 12/2003 | Broberg et al. |
| 6,732,307 B1 | 5/2004 | Edwards |
| 6,792,563 B1 | 9/2004 | DesRosier et al. |
| 6,823,428 B2 | 11/2004 | Rodriguez et al. |
| 6,834,365 B2 | 12/2004 | Bardsley et al. |
| 6,839,654 B2 | 1/2005 | Rollig et al. |
| 6,862,647 B1 | 3/2005 | Hewitt |
| 6,909,760 B2 | 6/2005 | Borowski et al. |
| 6,912,673 B1 | 6/2005 | Wyland |
| 6,973,543 B1 | 12/2005 | Hughes |
| 7,003,629 B1 | 2/2006 | Alsup |
| 7,200,776 B2 | 4/2007 | Harris |
| 7,213,126 B1 | 5/2007 | Smaus et al. |
| 7,555,633 B1 | 6/2009 | Smaus et al. |
| 7,873,874 B2 | 1/2011 | Choate et al. |
| 2002/0095553 A1 | 7/2002 | Mendelson et al. |
| 2002/0144101 A1 | 10/2002 | Wang et al. |
| 2003/0023835 A1 | 1/2003 | Kalafatis et al. |
| 2004/0083352 A1 | 4/2004 | Lee |
| 2004/0143721 A1 | 7/2004 | Pickett et al. |
| 2004/0153874 A1* | 8/2004 | Nitsch ............... 714/47 |
| 2004/0193857 A1 | 9/2004 | Miller et al. |
| 2004/0216091 A1 | 10/2004 | Groeschel |
| 2005/0033553 A1* | 2/2005 | Swaine et al. ............ 702/176 |
| 2005/0076180 A1 | 4/2005 | Smaus et al. |
| 2005/0125613 A1 | 6/2005 | Kim et al. |
| 2005/0125632 A1 | 6/2005 | Alsup et al. |
| 2009/0125756 A1* | 5/2009 | Swaine et al. ............ 714/45 |
| 2009/0207306 A1* | 8/2009 | Hagg ............... 348/512 |
| 2010/0106996 A1* | 4/2010 | Chang et al. ............ 713/501 |
| 2010/0281308 A1* | 11/2010 | Xu et al. ............ 714/45 |
| 2011/0126051 A1* | 5/2011 | Flautner et al. ............ 714/30 |
| 2012/0144240 A1 | 6/2012 | Rentschler et al. |
| 2012/0324290 A1* | 12/2012 | Chen et al. ............ 714/34 |

FOREIGN PATENT DOCUMENTS

| | | |
|---|---|---|
| GB | 2422464 | 6/2005 |
| WO | WO 2005/041024 | 5/2005 |

OTHER PUBLICATIONS

International Search Report and Written Opinion for PCT/US2004/039269, mailed Dec. 12, 2005, 11 pages.

Yuan Chou, et al., "Instruction Path Coprocessors," Mar. 2000, pp. 1-24.

Friendly, et al., "Putting the Fill Unit to Work: Dynamic Organizations for Trace Cache Microprocessors," Dept. of Electrical Engineering and Computer Sciences, The Univ. of Michigan, Dec. 1998, 9 pages.

Bryan Black, et al., "Turboscalar: A High Frequency High IPC Microarchitecture," Dept. of Electrical and Computer Engineering, Carnegie Mellon Univ., Jun. 2000.

Merten, et al., "An Architectural Framework for Run-Time Optimization," Jun. 2001, pp. 1-43.

Hinton, G., et al., "A 0.18-MUM CMOS IA-32 Processor with a 4-GHZ Integer Execution Unit," IEEE Journal of Solid-State Circuits, vol. 36, No. 11, Nov. 2001, pp. 1617-1627.

Sanjay J. Patel, et al., "Replay: A Hardware Framework for Dynamic Optimization," IEEE, vol. 50, No. 6, Jun. 2001, pp. 590-608.

Jacobson, et al., "Instruction Pre-Processing in Trace Processors," IEEE Xplore, Jan. 1999, 6 pages.

Bryan Black, et al., "The Block-Based Trace Cache," IEEE, 1999, pp. 196-207.

Palmer, et al., "Fido: A Cache that Learns to Fetch," Proceedings of the 17th International Conference on Very Large Data Bases, Barcelona, Sep. 1991, pp. 255-264.

Lai, et al., "Dead-Block Prediction & Dead-Block Correlating Prefetchers," 2001 IEEE, 11 pages.

Slechta, et al., "Dynamic Optimization of Micro-Operations," 2002 IEEE, 12 pages.

Jacobson, "High-Performance Frontends for Trace Processors," University of Wisconson—Madison, 1999, pp. 19, 20, 36, 37, 104-122.

U.S. Appl. No. 10/822,468, filed Apr. 12, 2004, Alsup, et al.

Xia, Huaxia, "Using Trace Cache in SMT", Jun. 10, 2001.

Examination Report for UK 0611775.8, mailed Nov. 30, 2006, 5 pages.

Rotenberg, et al. "Trace Cache: A Low Latency Approach to High Bandwidth Instruction Fetching", Published in the Proceedings of the 29th Annual International Symposium on Microarchitecture, Dec. 2-4, 1996, pp. 24-35.

Braught, Grant, "Class #21—Assemblers, Labels & Pseudo Instructions", Nov. 16, 2000.

Patterson, et al., "Computer Architecture: A Quantitative Approach", Morgan Kaufmann Publishers, Inc., 2nd Edition, 1996, pp. 271-278.

* cited by examiner

FIG. 6A

| Trace Stream 602 | | | | | |
|---|---|---|---|---|---|
| Trace Data | 9 | 58 | 80 | 1 | ← Resume From Halt Indicator |
| Trace Data | 9 | 59 | 80 | 1 | |
| Trace Data | 9 | 60 | 80 | 1 | |
| Trace Data | 10 | 0 | 60 | 0 | |
| Trace Data | 10 | 1 | 60 | 0 | |
| ⋮ | ⋮ | ⋮ | ⋮ | ⋮ | |

Columns: Global Field of Timestamp | Local Field of Timestamp | Local Clock Saturation Value

FIG. 6B

| Trace Stream 602 | | | | | |
|---|---|---|---|---|---|
| Trace Data | 9 | 58 | ~~80~~ 60 | 1 | ← Resume From Halt Indicator |
| Trace Data | 9 | 59 | ~~80~~ 60 | 1 | |
| Trace Data | 9 | 60 | ~~80~~ 60 | 1 | |
| Trace Data | 10 | 0 | 60 | 0 | |
| Trace Data | 10 | 1 | 60 | 0 | |
| ⋮ | ⋮ | ⋮ | ⋮ | ⋮ | |

Columns: Global Field of Timestamp | Local Field of Timestamp | Local Clock Saturation Value

CORRELATING TRACES IN A COMPUTING SYSTEM

BACKGROUND

1. Field of the Invention

The present invention relates generally to processors, and in particular to synchronizing trace data in a computing system.

2. Description of the Related Art

Many of the integrated circuits such as, for example, systems on chips (SoCs) and processors, being developed today include multiple functional units (or "blocks") such as processor cores, bridge units, graphics processing units, and so on. As the number of functional units per device increases, it becomes more difficult to analyze the behavior of the system. To help with software development, the debug process, and performance analysis of these systems, various functional units may generate trace data which can be post-processed to analyze the behavior of the system.

A trace stream of data representing the step-by-step activity in a SoC is a highly useful tool in system development. For example, tracing the activity of the system may involve: tracking the contents of registers, tracking the values stored at particular locations in cache and/or external memory, tracking the values of internal signals, and monitoring the status bus lines, paths or modules associated with a processor core. Trace streams may also be generated to include a history of instructions that have been executed (e.g., a stream of instruction pointer values). A debug module or post-processing software may then use these trace streams to identify which instructions were executed, the contents of various registers, and so on.

One of the challenges in systems containing multiple functional units is synchronizing the trace entries from the various blocks, particularly when they are running at different clock frequencies. Adding to this challenge, clock frequencies may change dynamically, and some blocks may be unaware of their own clock frequency. Therefore, there is a need in the art to be able to time-correlate trace streams from multiple independent sources running at different clock frequencies. Also, it is desirable to capture only the minimum amount of extra data necessary that will be needed to adequately understand the system's behavior.

SUMMARY OF EMBODIMENTS

In one embodiment, each of multiple functional units of a an integrated circuit (IC) may be configured to generate a trace stream for debugging purposes. Functional units may be processor cores, bridge units, graphics processors, or otherwise. Synchronization information may be added to each of the trace streams to allow traces from separate blocks to be time-correlated during post-processing of the trace data.

In one embodiment, each functional unit may run on an independent local clock, which may be different from other local clocks of the other functional units. Additionally, a global clock may be generated and distributed to each functional unit. In various embodiments, the global clock has a lower frequency than the local clocks. Timestamps may be inserted into the trace information stream(s) to indicate the time relative to the global clock. To provide increased granularity at a finer level than the global clock, each block may generate a local clock saturation value, which may represent a ratio of the local clock to the global clock. In one embodiment, the local saturation value may be generated by a local clock counter and may be included in each trace entry. The local clock counter may increment on the local clock and may get reset on the global clock.

In various embodiments, functional unit trace entries may include a "resume-from-halt" field. In at least one embodiment, this field is a single bit. When the local clock frequency of a functional unit changes, a resume-from-halt counter may be initialized and then begin decrementing at the global clock rate. The "resume-from-halt" bit may be the logical OR of the bits from the resume-from-halt counter.

In another embodiment, each core may include a global clock counter, which may be configured to increment on the global clock and generate a global timestamp. A "global timestamp change detected" bit may be allocated in each trace entry to indicate a change in the global timestamp. Post-processing software may utilize the "global timestamp change detected" bit to find the global clock edges in long periods of continuous tracing.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 6A is an example of a trace stream in accordance with one or more embodiments.

FIG. 6B is an example of a post-processed trace stream in accordance with one or more embodiments.

DETAILED DESCRIPTION OF EMBODIMENTS

Figure 1:
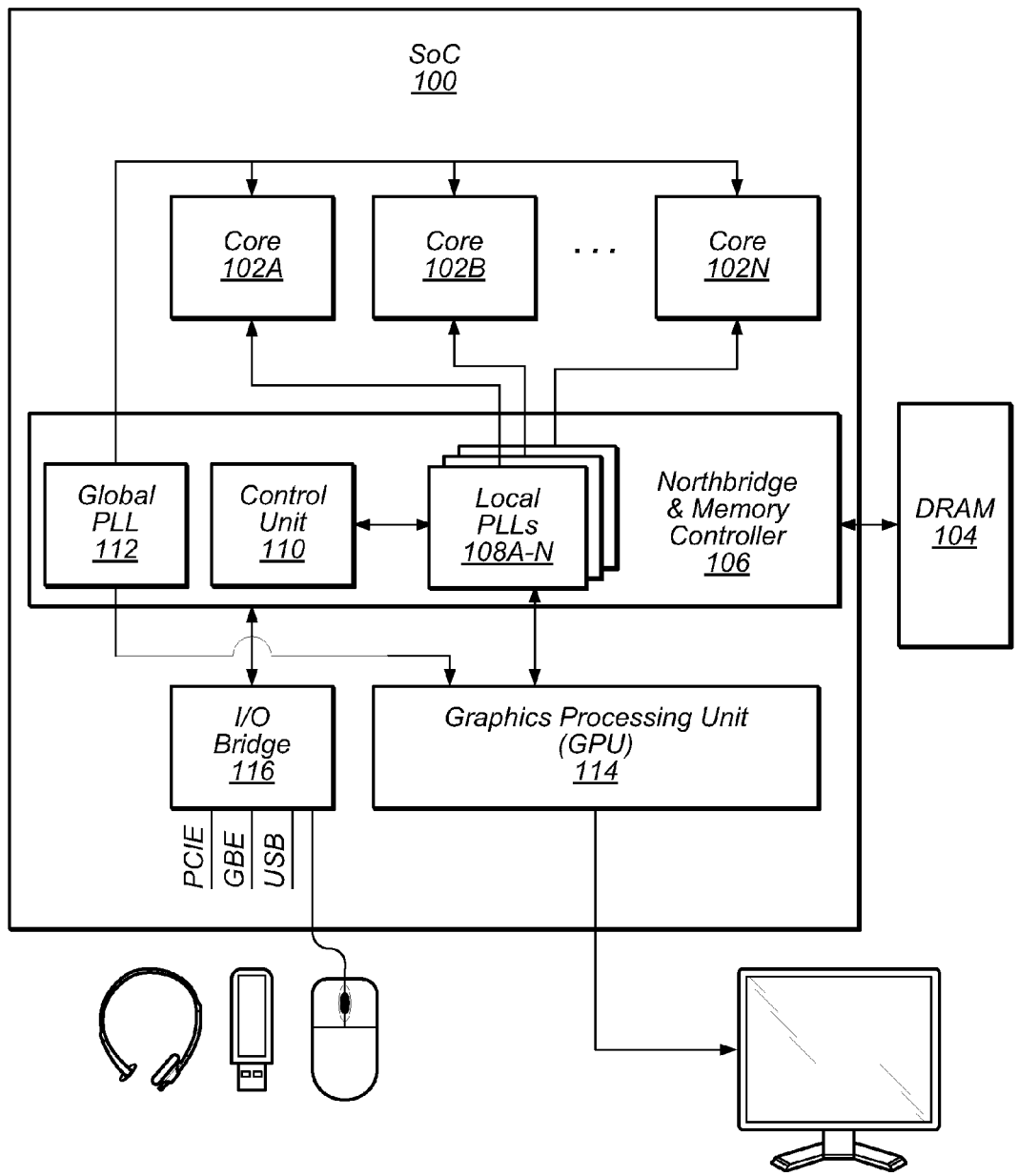
FIG. 1 is a block diagram of a SoC in accordance with one or more embodiments.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a plurality of cores . . . ." Such a claim does not foreclose the processor from including additional components (e.g., a northbridge, a memory).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical) unless explicitly defined as such. For example, in a processor with four cores, the terms "first" and "second" cores can be used to refer to any two of the four cores.

"Based On." As used herein, this term is used to describe one or more factors that affect a determination. This term does not foreclose additional factors that may affect a determination. That is, a determination may be based solely on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system on chip (SoC) 100 is shown. SoC 100 includes multiple processing cores 102A-N, a graphics processing unit (GPU) 114, an I/O bridge 116 (named "southbridge" in some embodiments) and northbridge 106 (which may be combined with a memory controller in some embodiments). GPU 114 is representative of any number of GPUs which may be included within SoC 100. Also, each GPU 114 may include a plurality of cores or shader processing units. SoC 100 may also be coupled to dynamic random-access memory (DRAM) 104 and various peripheral devices (e.g., headphones, USB drive, mouse, display). DRAM 104 is representative of any number and type of memories that may be utilized by SoC 100.

Northbridge 106 may include local phase-locked loops (PLLs) 108A-N, control unit 110, and global PLL 112. Each local PLL 108 may be configured to generate a local clock which may be utilized by one of cores 102A-N or GPU 114. Global PLL 112 may be configured to generate a global clock usable by the plurality of components of SoC 100. Control unit 110 may control the frequency of the various local clocks of cores 102A-N by configuring the local PLLs 108A-N. It is noted that while local PLLs 108A-N, control unit 110, and global PLL 112 are shown as being part of northbridge 106, in other embodiments they may be located elsewhere in the SoC 100.

In one embodiment, each core 102A-N may include a trace capture buffer (not shown) for storing trace data. In addition, GPU 114 may contain a trace capture buffer (not shown) for storing trace data. Furthermore, in other embodiments, there may be other trace capture buffers located elsewhere in SoC 100 for storing trace data generated by the various components. For example, in another embodiment, one or more trace capture buffers may be located within northbridge 106. In one embodiment, the size of the trace capture buffers may be large enough to be non-intrusive, even for large programs. However, it may nevertheless happen that a trace capture buffer is completely filled. The trace capture buffer may then store its contents in DRAM 104. In one embodiment, this process may be controlled by the memory controller 106. Each core 102A-N may also include a trace generation unit (not shown) configured to generate trace entries. The trace generation unit, or trace unit, may generate and/or collect various types of data and include this data within trace entries depending on the specific settings and operating modes of each core.

In one embodiment, each instruction executed by the various components of SoC 100 may be identified by an address, or program counter (PC), which locates the instruction in memory. The stream of PCs executed by a core or GPU may be useful to determine the program flow. In one embodiment, the stream of PCs may also be referred to as trace data. When each core 102A-N retires instructions at the end of its execution pipeline, the program counters (PCs) of the retired instructions may be logged as trace data. The trace data may also include the PCs of branches, exceptions, interrupts, and other data. Trace records from cores 102A-N and GPU 114 may be captured and stored in one or more trace buffers. As used herein, a trace record may refer to data that is captured with regard to an underlying activity or value. The trace record may be a direct copy of the underlying activity or value, or may indirectly specify the activity or value in cooperation with other trace records. For example, program counter (PC) trace records may trace the PCs of instructions executed by the host device. It is noted that the terms "trace record" and "trace entry" may be used interchangeably throughout this disclosure.

Oftentimes, the trace data may be stored temporarily in a small buffer before being written to memory (e.g., DRAM 104). Other sources may also write trace data to the trace buffers, and the trace data from the various sources may be interleaved within the trace buffers. In one embodiment, data may be read out of the trace buffers and written to memory via memory controller 106. The trace stream may include trace entries generated at various and dynamically changing rates.

Local phase-locked loops (PLLs) 108A-N and global PLL 112 are representative of any type of clock generation units which may be utilized within SoC 100. Each local PLL 108 may be independent of the other local PLLs 108. For example, a first local PLL 108A may generate a first local frequency for a first core 102A, and a second local PLL 108B may generate a second local frequency for a second core 102B. For example, the first local frequency may be 500 MHz and the second local frequency may be 400 MHz. These frequencies may change dynamically and/or be halted and restarted at any time, depending on the specific operating conditions of the SoC 100.

Northbridge 106 may be combined with a memory controller in some embodiments. In other embodiments, northbridge 106 and the memory controller may be separate components. In one embodiment, northbridge 106 may be configured to control the halting, restarting, and changing of clock frequencies for cores 102A-N. Northbridge 106 may also be configured to generate a northbridge trace stream. The northbridge trace stream may include data indicators related to core disconnect and connect events. Disconnect and connect events refer to a core being halted and restarted, respectively. The northbridge trace stream may also include frequency change indicators for the various cores and other functional units.

Figure 2:
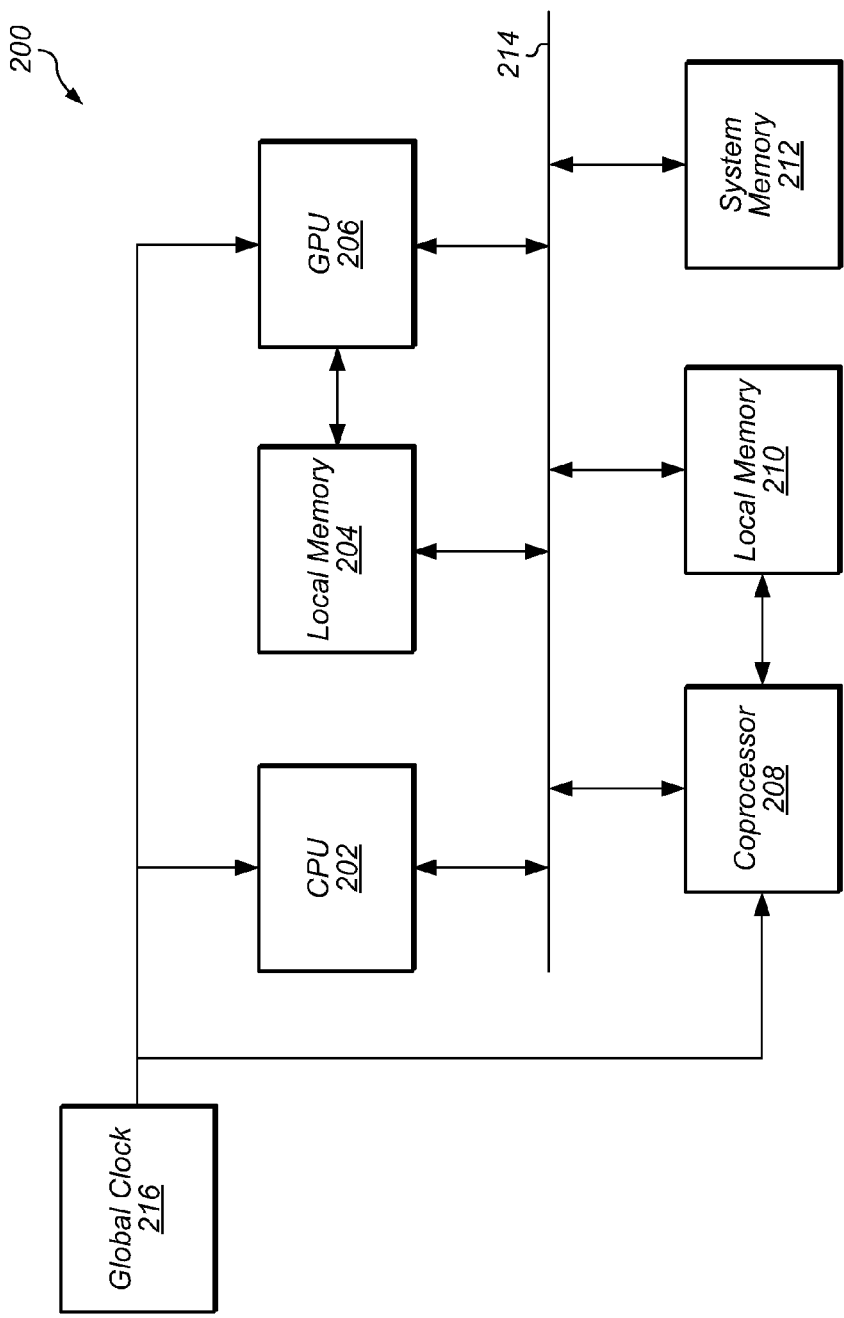
FIG. 2 is a block diagram of a computing system in accordance with one or more embodiments.

Turning now to FIG. 2, a block diagram of one embodiment of a computing system is shown. Computing system 200 includes a CPU 202, a GPU 206, and may optionally include a coprocessor 208. In one embodiment, CPU 202 and GPU 206 may be included on separate integrated circuits (ICs) or packages. In other embodiments, however, CPU 202 and GPU 206, or the collective functionality thereof, may be included in a single IC or package. Each of the processors shown in FIG. 2 may include a plurality of processor cores.

In addition, computing system 200 also includes a system memory 212 that may be accessed by CPU 202, GPU 206, and coprocessor 208. In various embodiments, computing system 200 may comprise a supercomputer, a desktop computer, a laptop computer, a video-game console, an embedded device, a handheld device (e.g., a mobile telephone, smart phone, MP3 player, a camera, a GPS device, or the like), or some other device that includes or is configured to include a GPU. Although not specifically illustrated in FIG. 2, computing system 200 may also include a display device (e.g., cathode-ray tube, liquid crystal display, plasma display, etc.) for displaying content (e.g., graphics, video, etc.) of computing system 200.

GPU 206 and coprocessor 208 may communicate with CPU 202 and system memory 212 over bus 214. Bus 214 may be any type of bus used in computer systems, including a peripheral component interface (PCI) bus, an accelerated graphics port (AGP) bus, a PCI Express (PCIE) bus, or another type of bus whether presently available or developed in the future. In other embodiments, other types of devices (e.g., field-programmable gate arrays (FPGAs), application-specific integrated circuits (ASICs)) may be utilized within computing system 200.

In addition to system memory 212, computing system 200 further includes local memory 204 and local memory 210. Local memory 204 is coupled to GPU 206 and may also be coupled to bus 214. Local memory 210 is coupled to coprocessor 208 and may also be coupled to bus 214. Local memories 204 and 210 are available to GPU 206 and coprocessor 208, respectively, in order to provide faster access to certain data (such as data that is frequently used) than would be possible if the data were stored in system memory 212.

GPU 206 may assist CPU 202 by performing certain special functions (e.g., graphics-processing tasks, data-parallel, general-compute tasks), usually faster than CPU 202 could perform them in software. Coprocessor 208 may also assist CPU 202 in performing various tasks. Coprocessor 208 may comprise, but is not limited to, a floating point coprocessor, a GPU, a video processing unit (VPU), a networking coprocessor, and other types of coprocessors and processors.

Global clock 216 may be coupled to CPU 202, GPU 206, and coprocessor 208. Each of CPU 202, GPU 206, and coprocessor 208 may also be coupled to a local clock source (not shown). CPU 202, GPU 206, and coprocessor 208 may generate trace data and may utilize global clock 216 and a local clock source to generate synchronization data to facilitate time-correlation of the trace data. The generation of the synchronization data will be described in further detail below.

Figure 3:
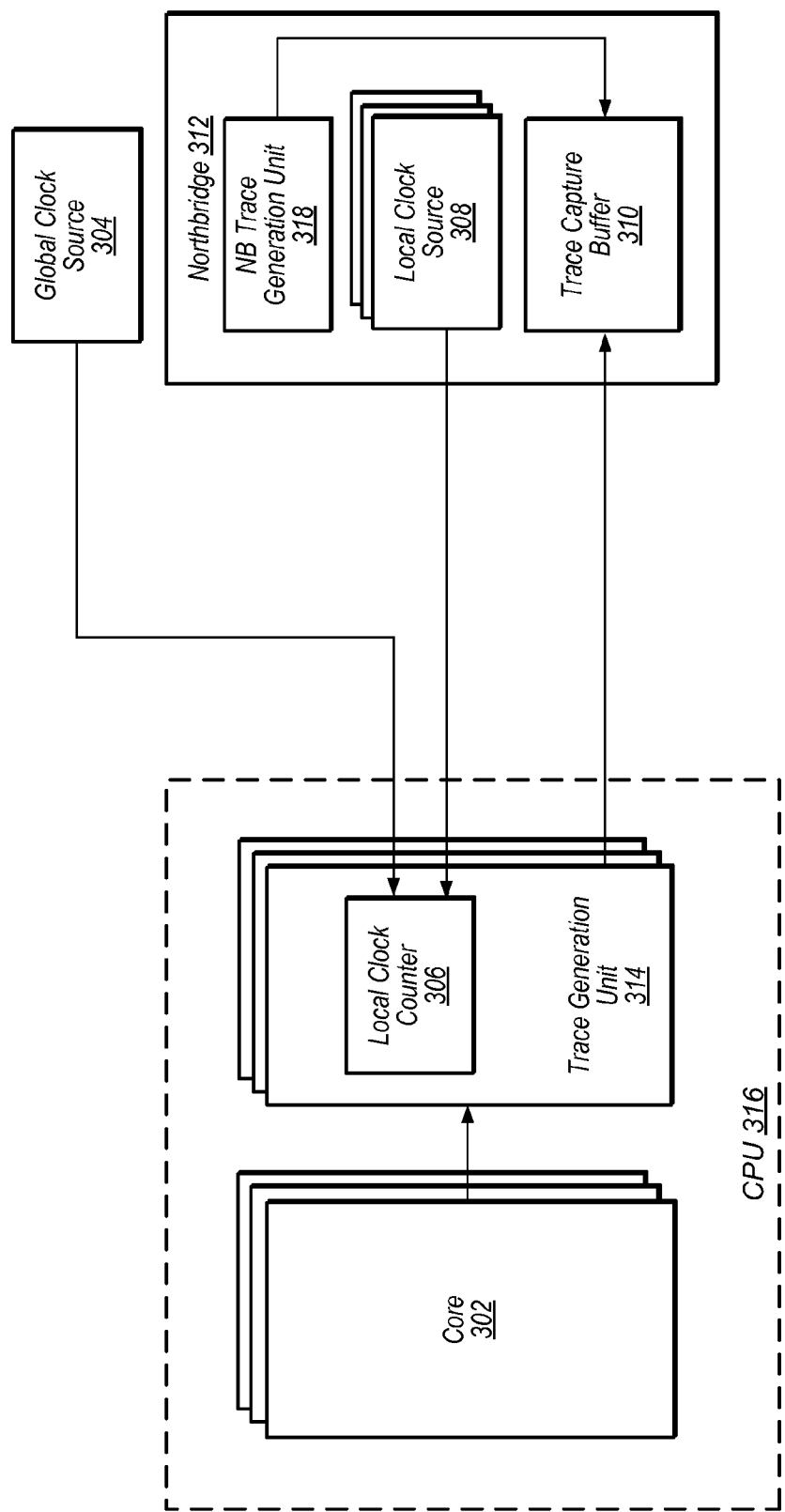
FIG. 3 is a block diagram of a CPU coupled to a northbridge in accordance with one or more embodiments.

Referring now to FIG. 3, a block diagram illustrating one embodiment of a CPU coupled to a northbridge is shown. It is noted that the descriptions herein generally describe traces generated within or corresponding to a processor core for ease of discussion. However, it is to be appreciated that the methods and mechanisms described herein may be applied to other functional units (e.g., bridge chips and other units within a system). Core 302 is representative of any number of cores which may be included in CPU 316. In one embodiment, each core 302 may be coupled to a separate trace generation unit 314. In another embodiment, two or more cores may share a common trace generation unit 314.

Trace generation unit 314 may include local clock counter 306. Counter 306 may increment on the local clock generated by local clock source 308. Counter logic 306 may also be configured to receive the global clock from global clock source 304. On a global clock edge, counter 306 may be reset and then start counting again from zero. The value of counter 306 at the global clock edge may be stored and this value may be referred to as the local clock saturation value (i.e. the value of the local clock counter when it was reset to zero at the last global clock edge). This value may be encoded in the trace data and may be used to indicate the relationship between the core clock frequency and the global clock frequency during the global clock period preceding the one in which the trace entry was stored. In various embodiments, the local clock saturation value relies on having at least one full global clock period at the current local clock rate. In such embodiments, a mechanism is provided to detect the time immediately after a clock frequency change, during which the local clock saturation value does not accurately reflect the local clock. This period may, for example, generally extend from the "reconnect" moment (when the core resumes) to the second global clock strobe following the reconnect. During this time we may not know the relationship between the local and global clock rates. This may be indicated by a 1-bit "resume-from-halt" field in each core trace entry. When the core is reconnected, a counter may be used to count two global clock cycles. For example, a counter may be used which down-counts at the global clock rate from two to zero and the "resume-from-halt" bit may be the logical OR of the bits from that counter, sampled at the time the trace entry is stored. The local clock saturation value represents the ratio between the local clock and the global clock. For example, if the global clock is 10 MHz, and the local clock is 500 MHz, then the local clock saturation value will be 50. In one embodiment, this local clock saturation value may be included in each trace entry to represent a relationship between the local clock and global clock. In one embodiment, core 302 may not know the local clock frequency, and so the local clock saturation value may provide an indication of the local clock frequency in trace entries. Trace generation unit 314 is shown in FIG. 3 as being a separate unit from core 302, but in some embodiments, unit 314 may be embedded within core 302.

Northbridge 312 may be coupled to trace generation unit 314. In one embodiment, northbridge 312 may include a local clock source 308 for each core 302. In another embodiment, the local clock source 306 may be located separately from northbridge 312. Northbridge 312 may also include northbridge trace generation unit 318 which is configured to generate a trace stream based on the underlying activity of northbridge 312. In some embodiments, the northbridge trace entries may be structured differently than processor core trace entries. For example, in one embodiment, each northbridge trace entry may include a core identifier and a corresponding indication of a core disconnect or connect event. Each northbridge trace entry may also include frequency change indicators for the various cores 302. Each entry may also include one or more variable-length data fields for storing other data related to the operation of the northbridge.

Northbridge trace generation unit 318 may also be coupled to trace capture buffer 310 to store trace entries generated by unit 318. Trace capture buffer 310 may also store trace entries generated by trace generation unit 314. In another embodiment, there may be multiple trace capture buffers for storing trace entries. For example, in some embodiments trace data may be captured in a trace capture buffer included in the CPU 316, rather than being sent to a buffer in the northbridge 312. A variety of such embodiments are possible and are contemplated.

Figure 4:
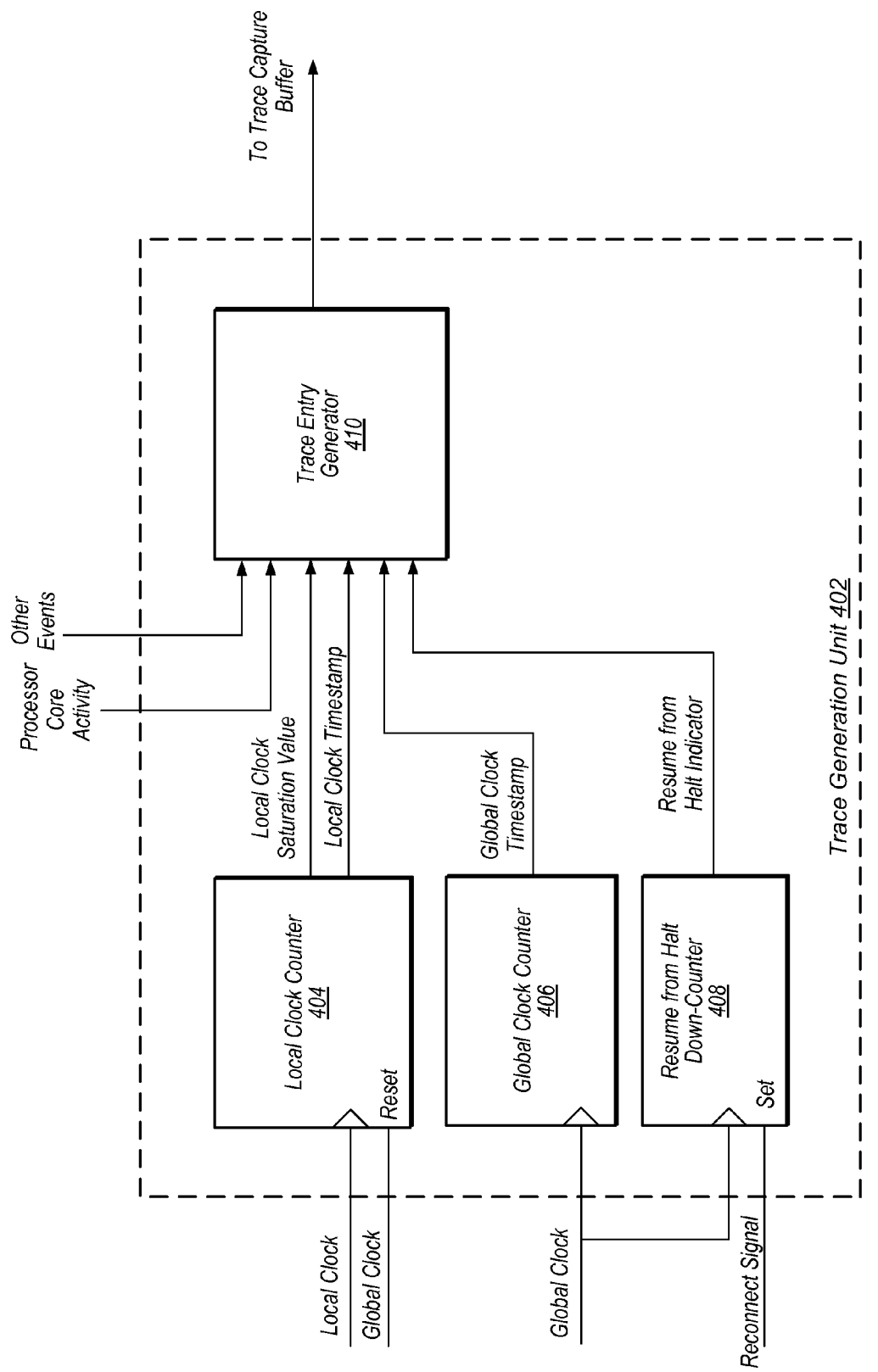
FIG. 4 is a block diagram of a trace generation unit in accordance with one or more embodiments.

Turning now to FIG. 4, a block diagram of one embodiment of a trace generation unit 402 is shown. Trace generation unit 402 may include local clock counter 404, global clock counter 406, resume from halt down counter 408, and trace entry generator 410. Trace generation unit 402 may be located within a host processor core or other functional unit, or may be coupled to the host processor core depending on the embodiment. Trace generation unit 402 may be configured to generate trace entries for its corresponding host processor core. In other embodiments, trace generation unit 402 may also include other logic not shown in FIG. 4.

Local clock counter 404 may increment on the local clock and be reset on the global clock. Local clock counter 404 may generate the local clock saturation value, which is the maximum value reached by counter 404 before being reset by the edge of the global clock. Local clock counter 404 may also generate the local clock timestamp and convey this value, and the local clock saturation value, to trace entry generator 410.

Global clock counter 406 may receive the global clock and generate the global clock timestamp. The global clock timestamp may be coupled to trace entry generator 410. Global clock counter 406 and local clock counter 404 may be any of various sizes depending on the embodiment. Resume from halt down counter 408 may be configured to be initialized to a value of two and then may decrement on the global clock. Counter 408 may receive the reconnect signal from a northbridge (not shown) or other logic and this signal may initialize counter 408 to a value of two. This reconnect signal may be provided to counter 408 when the clock frequency of the local clock is changed or if the host processor core is halted or restarted.

Trace entry generator 410 may be configured to generate trace entries utilizing the various data and values coupled from the counters, host processor core, northbridge (not shown), and other logic. In one embodiment, each trace entry may be 64 bits long, although in other embodiments, the size of the trace record may vary. Also, the size of the trace entry may vary within a single computing system, such that traces of 32 bits may be generated, then 64 bits in a later time period, and so on.

The "processor core activity" information provided to trace entry generator 410 may vary from embodiment to embodiment. Circuitry internal to a corresponding processor core may monitor the operations of the core and record information such as changes to selected registers, jumps, calls, returns, and interrupts. The "processor core activity" may include information such as program counters (PCs) of executed instructions, retired instructions, a number of instructions that were retired, cache misses, cache hits, bus activity, taken branches, branch predictions, exceptions, machine state, and the like. Bus activity may include, for example, memory reads and input/output reads from the northbridge, memory writes from a southbridge, and interrupt acknowledge cycles. In some embodiments, tracing may be started according to a trigger event. Also, the frequency of trace entry generation may vary from embodiment to embodiment.

Each core and functional unit of a SoC may keep track of the local clock saturation value. The local clock saturation value refers to the value of local clock counter 404 before it is reset to zero by a global clock edge. This value may be encoded into each trace entry generated by the core. In some embodiments, there may be only a few possible local clock frequencies that are utilized, resulting in only a few possible local clock saturation values. In these embodiments, the local clock saturation value may be encoded into a few bits to reduce the total number of bits that are used to represent this value. For example, if there are only four possible local clock frequencies for a particular processor core, then the local clock saturation value may be encoded into a two-bit value. This may ensure that a minimum amount of extra bits are added to each trace entry. Other fields of the trace entry may be similarly encoded to reduce the number of bits of these fields.

"Other events" may refer to a reconnect, frequency change, or other event which may be conveyed to trace entry generator 410 and utilized to populate one or more fields of a trace entry. In some cases, a northbridge (not shown) may initiate or detect a reconnect or frequency change event and notify the core and/or trace generation unit 402. Each core (functional unit) may be configured to indicate when a reconnect or a frequency change event occurs. Immediately following such an event, the local clock saturation value may not be accurate. The time when the local clock saturation value is invalid may extend from the actual event until the beginning of the second full global clock cycle (i.e. the second global clock strobe following the event). During this time, the relationship between the local and global clock rates may be unknown. After the reconnect or frequency change event, counter 408 may be initialized to decrement at the global clock rate from two to zero. The output bits of counter 408 may be coupled to a logical OR (not shown), and the logical OR of the bits may be sampled at the time a trace entry is generated. This value may be referred to as the "resume-from-halt" indicator, which may be a 1-bit value. In one embodiment, this indicator may be included in each trace entry.

Figure 5:
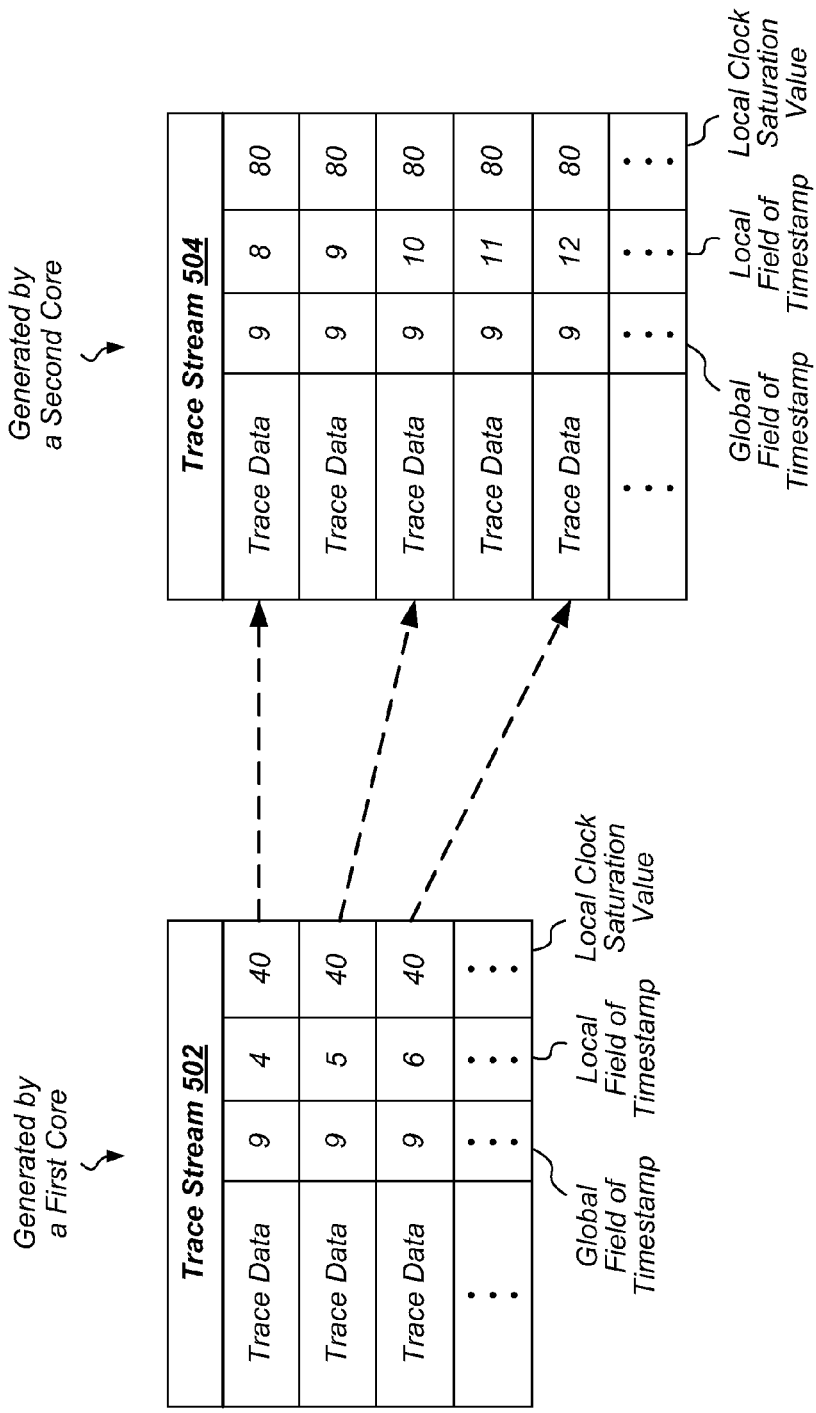
FIG. 5 is an example of two separate trace streams in accordance with one or more embodiments.

Referring now to FIG. 5, an example of two separate trace streams in accordance with one or more embodiments is shown. A first processor core may generate trace stream 502 and a second processor core may generate trace stream 504. The first core may have been executing at a first frequency during the generation of the portion of trace stream shown in FIG. 5. The second core may have been executing at a second frequency different than the first frequency. The values shown in trace streams 502 and 504 are digital values, but this is for illustrative purposes only. The actual stored values may be in binary (e.g., 1001) or hexadecimal (e.g., 0x09) representation, but the values are shown in digital (e.g., 9) representation for ease of illustration. The actual sizes of the trace entries may vary from embodiment to embodiment.

A post-processing analysis may be performed on trace streams 502 and 504 to time-correlate the entries generated by the first and second cores. For example, it may be helpful in a debugging effort to determine which instruction was executing on the second core simultaneously while a given instruction was executing on the first core. As shown in FIG. 5, by including timestamp and local clock saturation values in the trace entries, the entries in trace streams 502 and 504 may be time-correlated. The dashed arrows show the correlation between trace entries of the first and second cores. The value of '9' in the global field of the timestamp establishes that the global clock period is matched between the entries, and then the entries may be correlated more precisely using the local field of the timestamp and the local clock saturation value.

In the embodiment shown in FIG. 5, it may be assumed for illustrative purposes that the global clock is 10 MHz. Based on the local clock saturation value of '40', the local clock of the first core may be calculated as 400 MHz. The local clock of the second core may be calculated as 800 MHz based on the local clock saturation value of '80'. Therefore, a value of '4' in the local field of the timestamp of trace stream 502 corresponds to a value of '8' in the local field of the timestamp of trace stream 504, a value of '5' in trace stream 502 corresponds to a value of '10' in trace stream 504, and so on.

In other embodiments, the first and second clock frequencies may be frequencies that are not as easy to reconcile as frequencies like 400 and 800 MHz. In those cases, the entries from separate trace streams may not precisely match in time, but the chronology of when the entries were generated may be recreated so that it may be determined when entries were generated in a first trace stream in relation to entries from a second trace stream.

In other embodiments, more than two trace streams may be time-correlated using the techniques described herein. Although not shown in FIG. 5, in some embodiments, the trace entries may include a source field which may identify the source of the entry. Thus, entries from different sources, which may be interleaved in a trace capture buffer, can be identified. It is noted that in other embodiments, the trace entries may be organized differently and may include additional information or less information, depending on the embodiment.

Referring now to FIG. 6A, an example of a trace stream in accordance with one or more embodiments is shown. Trace stream 602 may have been generated by a first processor core. Trace stream 602 may include a "resume from halt" bit to indicate that the local clock frequency has recently changed, or the local clock has been restarted following a halt. As shown in FIG. 6A, the first three entries of trace stream 602 have the "resume from halt" bit set. Therefore, in these entries, the local clock saturation value of 80 is invalid for these entries. When the "resume from halt" bit is set, the local clock saturation value may be ignored. The "resume from halt" bit may be set during the two global clock cycles following the actual reconnect or frequency change event. Starting with the fourth entry of trace stream 602, the "resume from halt" bit is cleared ('0'), indicating that the new local clock saturation value of 60 is valid for these entries. Although not shown in trace stream 602 because of the limited number of trace entries displayed, the "resume from halt" indicator may be set for two full global clock cycles. Accordingly, all trace entries of trace stream 602 with a global field of timestamp value of '8' or '9' will have the "resume from halt" bit set.

Referring now to FIG. 6B, an example of a post-processed trace stream is shown. In one embodiment, the local clock saturation values may be updated to reflect the actual ratio of the local clock to the global clock in the two clock cycles immediately following the frequency change or reconnect event. When the local clock saturation value is updated after two global clock cycles, the new local clock saturation value (60) may be the accurate value for a portion of the previous two clock cycles, depending on what event occurred and when it occurred.

As shown in the first three entries of trace stream 602, the invalid local clock saturation value (80) in the trace entries with a "resume from halt" bit set to '1' may be overwritten with the new local clock saturation value (60). This overwriting of local clock saturation values may be performed during a post-processing phase. In other embodiments, rather than being overwritten, the local clock saturation values of trace entries with a "resume from halt" bit set to '1' may be ignored or discarded.

Figure 7:
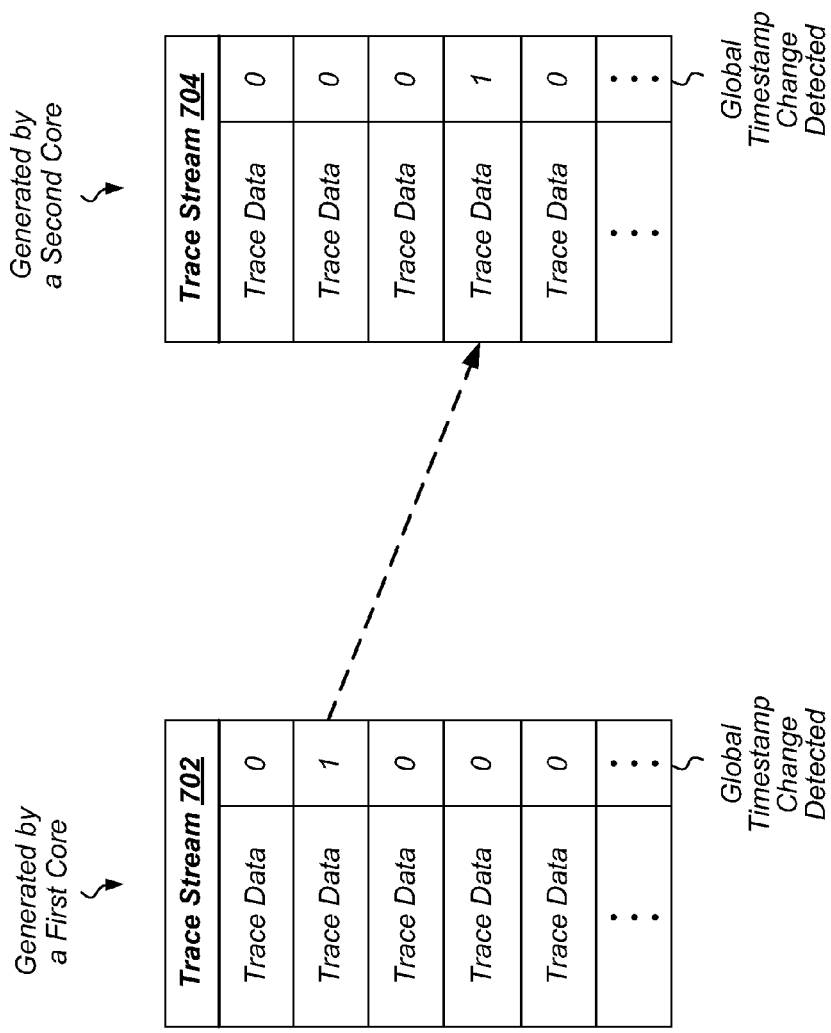
FIG. 7 is an example of a pair of trace streams in accordance with one or more embodiments.

Referring now to FIG. 7, one embodiment of a pair of trace streams is shown. A first core may generate trace stream 702 and a second core may generate trace stream 704. In the embodiment shown in FIG. 7, the trace entries do not include a timestamp field, which may be due to the specific operating mode of the two cores. For example, a first trace generation mode may be utilized such that a trace entry is generated on each clock cycle. In this mode, a bit may be allocated in each trace entry to store a "global timestamp change detected" indicator. This bit will allow post-processing software to find global clock edges in long periods of continuous tracing without the use of actual timestamps.

In a second trace generation mode, it may be determined that the minimum amount of extra data should be generated. Instead of generating a timestamp which may take multiple bits, an extra bit for a "global timestamp change detected" indicator may be added to the trace entries. In this way, only a single extra bit is added to each trace entry, and more space may be allocated to the actual trace data generated by each core.

The core trace logic may include a comparator, and the comparator may be configured to continuously compare the global timestamp at clock 'n' to the value of the global timestamp at clock 'n−1'. The output of the comparator may be sampled and used to populate the "global timestamp change detected" bit of the trace entries. Post-processing software may then be able to find the global clock edges in long periods of continuous tracing without the use of timestamps. As shown in FIG. 7, the second trace entry of trace stream 702 lines up with the fourth trace entry of trace stream 704, as indicated by the dashed arrow.

Figure 8:
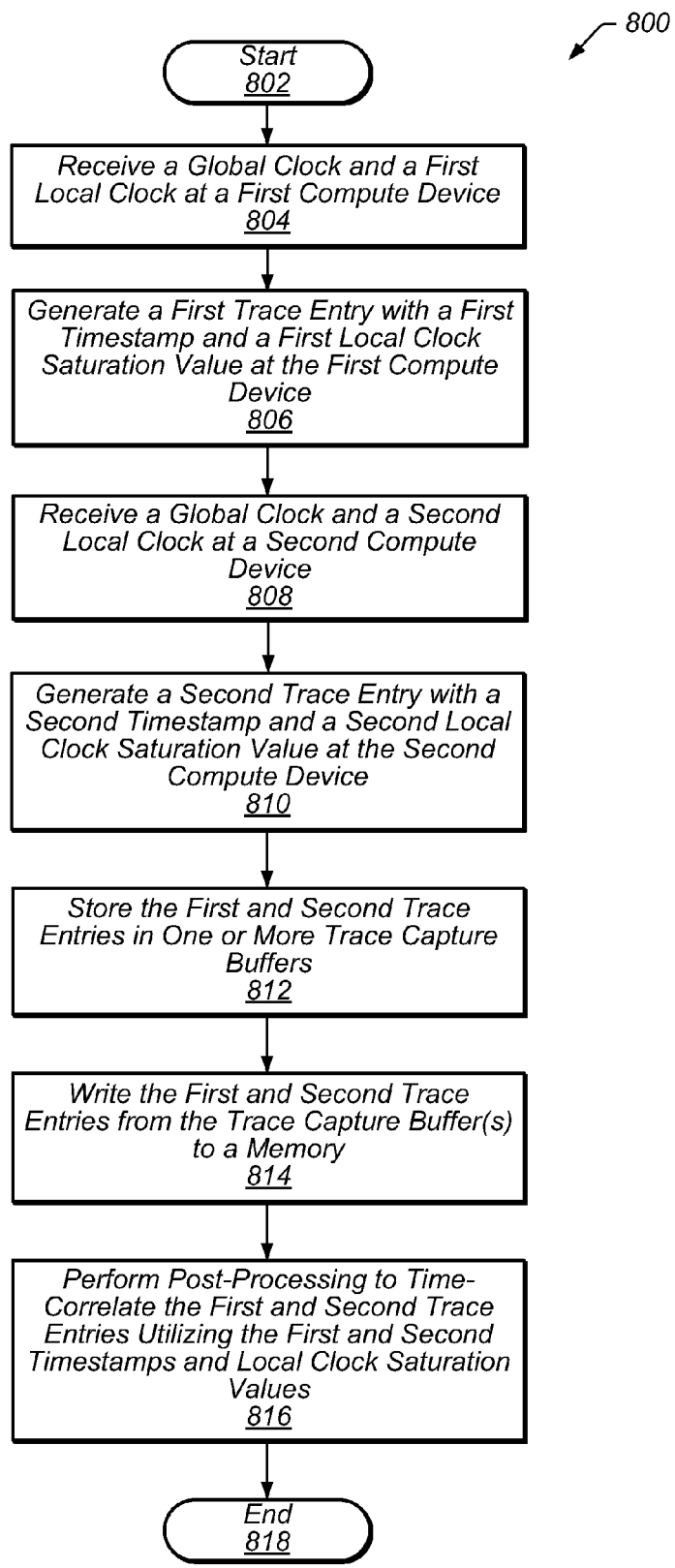
FIG. 8 is a generalized flow diagram illustrating one embodiment of a method for generating and time-correlating trace data from multiple functional units.

Turning now to FIG. 8, one embodiment of a method for generating and time-correlating trace data from multiple functional units is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

Method 800 may start in block 802, and then a first functional unit may receive a global clock and a first local clock (block 804). In various embodiments, the first functional unit may be a processor (e.g., CPU, GPU, DSP), a processor core, a programmable logic device (e.g., FPGA), a northbridge, a southbridge, or other devices. The first local clock may be running at a higher frequency than the global clock, and the first functional unit may utilize the first local clock to operate its hardware circuitry.

The first functional unit may generate a first trace entry, and the first trace entry may include trace data, a first timestamp, and a first local clock saturation value (block 806). The trace data may include any of various types of information that may be helpful in debugging or analyzing the operation of the first functional unit. In one embodiment, the first timestamp may include a global clock field and a first local clock field. The first local clock saturation value may represent a ratio of the first local clock frequency to the global clock. In one embodiment, the first functional unit may include a counter to generate the first local clock saturation value. The counter may increment on the first local clock and then be reset on the global clock. The maximum value reached by the counter may be captured and stored as the first local clock saturation value.

A second functional unit may receive the global clock and a second local clock (block 808). The second functional unit may be any of the previously listed types of devices. The second local clock may be running at a higher frequency than the global clock, and the second functional unit may utilize the second local clock to operate its hardware circuitry. Furthermore, the second local clock may be running at a different frequency than the first local clock.

The second functional unit may generate a second trace entry, and the second trace entry may include trace data, a second timestamp, and a second local clock saturation value (block 810). The second local clock saturation value may represent a ratio of the second local clock frequency to the global clock, and the second functional unit may generate the second local clock saturation value as previously described.

In one embodiment, the first and second trace entries may be stored in one or more trace capture buffers (block 812). In one embodiment, the first and second trace entries may be stored in the same trace capture buffer. In another embodiment, the first and second trace entries may be stored in separate trace capture buffers, and each functional unit in the system may have a separate trace capture buffer. In a further embodiment, some functional units may have their own trace capture buffers while other functional units may share a trace capture buffer.

Next, the first and second trace entries may be written from the trace capture buffer(s) to a memory (block 814). Then, post-processing may be performed on the first and second trace entries (block 816). Post-processing may also be performed on any other trace entries that have been stored. The post-processing may involve time-correlating the first and second trace entries utilizing the first and second timestamps and the first and second local clock saturation values. The post-processing may allow for the timing of the first and second trace entries in relation to each other to be determined. In one embodiment, the post-processing may be performed to create a timeline or chronology of trace entries to determine the timing of when certain events (e.g., executed instructions, memory writes, cache misses) occurred. In other embodiments, other representations may be generated to facilitate the analysis and debug of the host system or device.

After block 816, method 800 may end in block 818. In other embodiments, method 800 may be utilized by more than two separate functional units. Any number of functional units may be utilized with method 800, and the trace entries generated by each functional unit may be time-correlated in a post-processing phase utilizing the techniques disclosed herein.

It is noted that the above-described embodiments may comprise software. In such an embodiment, program instructions and/or a database that represent the described methods and mechanisms may be stored on a non-transitory computer readable storage medium. The program instructions may include machine readable instructions for execution by a machine, a processor, and/or any general purpose computer for use with or by any non-volatile memory device. Suitable processors include, by way of example, both general and special purpose processors.

Generally speaking, a non-transitory computer readable storage medium may include any storage media accessible by a computer during use to provide instructions and/or data to the computer. For example, a non-transitory computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g., Flash memory) accessible via a peripheral interface such as the USB interface, etc. Storage media may include micro-electro-mechanical systems (MEMS), as well as storage media accessible via a communication medium such as a network and/or a wireless link.

In other embodiments, the program instructions that represent the described methods and mechanisms may be a behavioral-level description or register-transfer level (RTL) description of hardware functionality in a hardware design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the database on the computer accessible storage medium may be the netlist (with or without the synthesis library) or the data set, as desired. While a computer accessible storage medium may carry a representation of a system, other embodiments may carry a representation of any portion of a system, as desired, including an IC, any set of programs (e.g., API, DLL, compiler) or portions of programs.

Types of hardware components, processors, or machines which may be used by or in conjunction with the present invention include ASICs, FPGAs, microprocessors, or any integrated circuit. Such processors may be manufactured by configuring a manufacturing process using the results of processed HDL instructions (such instructions capable of being stored on a computer readable medium). The results of such processing may be maskworks that are then used in a semiconductor manufacturing process to manufacture a processor which implements aspects of the methods and mechanisms described herein.

Although the features and elements are described in the example embodiments in particular combinations, each feature or element can be used alone without the other features and elements of the example embodiments or in various combinations with or without other features and elements. It should also be emphasized that the above-described embodiments are only non-limiting examples of implementations.

Numerous variations and modifications will become apparent to those skilled in the art once the above disclosure is fully appreciated. It is intended that the following claims be interpreted to embrace all such variations and modifications.

What is claimed is:

1. An integrated circuit comprising a plurality of functional units, wherein each functional unit is configured to:
   operate responsive to a local clock, wherein each local clock is independent of local clocks corresponding to other functional units; and
   generate a plurality of trace entries, wherein each trace entry comprises trace data and synchronization data, and wherein the synchronization data enables trace entries from separate functional units to be time-correlated;
   wherein the synchronization data comprises a timestamp and a local clock saturation value, wherein each functional unit of the plurality of functional units is further configured to:
      generate the timestamp based on the global clock and the local clock; and
      generate the local clock saturation value, wherein the local clock saturation value represents a number of local clock cycles per global clock cycle.

2. The integrated circuit as recited in claim 1, wherein each functional unit is further configured to receive a global clock and a local clock, wherein the global clock is running at a lower frequency than the local clock.

3. The integrated circuit as recited in claim 2, wherein trace entries from separate functional unit may be used to time-correlate trace data in a post-processing phase.

4. The integrated circuit as recited in claim 2, wherein two or more of the functional units are configured to run at different local clock frequencies.

5. The integrated circuit as recited in claim 1, wherein a local clock saturation value is included in one or more of the trace entries.

6. The integrated circuit as recited in claim 2, wherein the synchronization data comprises a global clock edge detection indicator.

7. The integrated circuit as recited in claim 2, wherein at least one functional unit of the plurality of functional units is configured to:
   generate a plurality of trace entries;
   monitor local clock frequency changes and encode local clock frequency change indicators in respective trace entries; and
   monitor disconnect and connect events and encode indicators corresponding to the disconnect and connect events in respective trace entries.

8. The integrated circuit as recited in claim 2, wherein the processor is further configured to store trace entries in a trace capture buffer prior to conveying the trace entries to a memory.

9. The integrated circuit as recited in claim 2, wherein each functional unit does not know a specific frequency of its local clock.

10. An apparatus comprising a plurality of functional units, wherein each functional unit is configured to:
    receive at least one of a global clock and a local clock, wherein the local clock is at a different frequency than the global clock, wherein a functional unit is operative at its respective local clock; and
    generate a trace stream comprising a plurality of trace entries, wherein each trace entry comprises synchronization data reflective of a relationship between the local and global clock frequencies;
    wherein the synchronization data further comprises a timestamp and a local clock saturation value, wherein each functional unit of the plurality of functional units is further configured to:
       generate the timestamp based on the global clock and the local clock; and
       generate the local clock saturation value, wherein the local clock saturation value represents a number of local clock cycles per global clock cycle.

11. The apparatus as recited in claim 10, wherein each functional unit comprises a local clock counter, and wherein the local clock counter is configured to generate a local clock saturation value.

12. The apparatus as recited in claim 10, wherein the local clock of a given functional unit is independent of local clocks of other functional units.

13. The apparatus as recited in claim 10, wherein each trace entry further comprises data which indicates a change to the local clock frequency has been detected.

14. The apparatus as recited in claim 13, wherein the indicator comprises a bit which is set for two global clock periods following the change to the local clock frequency.

15. The apparatus as recited in claim 13, wherein said data comprises a local clock saturation value which is deemed invalid in trace entries where the indicator is set.

16. A method comprising:
    receiving at least one of a global clock and a first local clock at a first functional unit;
    generating synchronization data comprising a first trace entry at the first functional unit, wherein the first trace entry comprises a first timestamp and data reflective of a relationship between the first local and global clock frequencies;
    receiving at least one of the global clock and a second local clock at a second functional unit; and
    generating a second trace entry at the second functional unit, wherein the second trace entry comprises a second timestamp and data reflective of a relationship between the second local and global clock frequencies;
    wherein the synchronization data comprises a timestamp and a local clock saturation value, wherein the method comprises:
       generating the timestamp based on the global clock and the local clock; and
       generating the local clock saturation value, wherein the local clock saturation value represents a number of local clock cycles per global clock cycle.

17. The method as recited in claim 16, wherein the global clock is running at a lower frequency than the first and second local clocks, wherein the data in the first trace entry represents a ratio of the first local clock frequency to the global clock frequency, and wherein the data in the second trace entry represents a ratio of the second local clock frequency to the global clock frequency.

18. The method as recited in claim 16, wherein each of the first and second timestamps comprises a global clock value and a local clock value.

19. The method as recited in claim 16, further comprising:
    storing the first and second trace entries in one or more trace capture buffers;
    writing the first and second trace entries from the one or more trace capture buffers to a memory.

20. The method as recited in claim 16, wherein the first local clock is running at a first frequency, wherein the second local clock is running at a second frequency, and wherein the second frequency is different than the first frequency.

* * * * *